P. A. P. DAVIS.
CALL BOX.
APPLICATION FILED JUNE 2, 1913.

1,148,484.

Patented July 27, 1915.
4 SHEETS—SHEET 1.

Attest:
Mitchell
R. Richardson

Pierre Alexis Proal Davis
Inventor:
by Lowell W. Loveland
Atty

P. A. P. DAVIS.
CALL BOX.
APPLICATION FILED JUNE 2, 1913.

1,148,484.

Patented July 27, 1915.
4 SHEETS—SHEET 4.

Inventor:
Attest:
by
Atty

UNITED STATES PATENT OFFICE.

PIERRE ALEXIS PROAL DAVIS, OF BALTIMORE, MARYLAND.

CALL-BOX.

1,148,484. Specification of Letters Patent. Patented July 27, 1915.

Application filed June 2, 1913. Serial No. 771,221.

*To all whom it may concern:*

Be it known that I, PIERRE ALEXIS PROAL DAVIS, a citizen of the United States, residing at Baltimore, in the State of Maryland, have invented a new and useful Call-Box, of which the following is a specification.

My invention relates to improvements in call boxes or signal transmitters, such for example as may be used to send in over the same line and from the same box a plurality of different signals each conveying a different meaning, such as a watchman's or box number indicating the location, and when desired, an alarm as of fire, and a drill signal; each complete signal being capable of transmission alone and independently of the other.

It will be understood that where I refer to different signals,—I mean signals which as a whole,—and no matter how derived,— convey an individual and distinctive meaning;—for example a "drill" signal may consist of a break of the circuit caused by the manipulation of a special key followed by the peculiar arrangement of breaks caused by the operation of the "location" call break wheel disk:—the "alarm" may consist of the "location" call plus or in addition to a special signal such as five breaks,—but the "drill" signal is separate and distinct; the "location" signal is separate and distinct; and the "alarm" signal is separate and distinct, because each is different from the other in its entirety, and each as a whole is independent of the other, though one may embody another as a part of itself.

My invention also provides novel and improved means, and new and improved construction and arrangement of operating parts, by which the watchman's or "location signal" and the "drill" or other signal may be sent in by key freely, selectively and at any time without sounding the "alarm," while the "alarm" can only be sounded by a deliberate act such as the breaking of an obstruction, lock, or seal, which normally keeps the "alarm" mechanism inoperative, but which when broken permits the "alarm" device to be at once cut in.

My invention also further provides for the automatic return of the "alarm" mechanism to the normally inoperative position at the termination of the "alarm,"—so that only "location" or "drill" or other signals and not the "alarm" will be sent in unless the "alarm" mechanism be each time deliberately operated.

My invention further relates to an improved seal for the "alarm" transmitting mechanism, and to the improved arrangement and construction of the box leaving the mechanism easily accessible.

The objects of my invention are to provide improved means for positively and normally maintaining the "alarm" mechanism inoperative during the "location" and other calls,—improved means for positively cutting in the alarm mechanism when desired, and improved means for sending either or both signals through the same metallic circuit or a ground connection should the metallic circuit become inoperative, and through both or either circuits by the same intermediate mechanical and electrical means; thus doing away with the double break wheels ordinarily used in the McCullough system.

A further object is to simplify and reduce the number of parts, and provide a more efficient and economical device.

Heretofore in devices of a similar nature the "alarm" signal has usually been given by the same device, (usually called a break wheel), that gives the watchman's or "location" signal,—teeth or prominences on the wheel making contacts directly or indirectly with pens or brushes in the electric circuit,—and usually the arrangement has included a certain number of teeth placed in a particular order and sequence for the "location" call,—and following these, on the same wheel, another group of teeth adapted to sound the distinctive "alarm" or code signal, for example to indicate a fire; in some cases the distinction between these calls has been attained by varying the number of times the signal is repeated,— in other instances, mechanism has been employed to cut out the "alarm" when it is desired to send only the "location" signal; in the latter case the alarm is normally operative but it is cut out when not intended to be transmitted. An objection to this arrangement is that if the key or other operating means used for sending the location call is turned too far the cut out device is delayed in action so that the "alarm" is transmitted; the cut out device being devised to operate to cut out the alarm only when the operating means is given a limited movement.

In some devices separate pens or contact devices are used on the location break wheel and on the alarm break wheel, each break wheel operating its own pen which multiplies the parts liable to be injured or become out of adjustment and thus complicates the apparatus. Furthermore in some devices means have been employed to cut out the "alarm" transmitting devices, before the last round is completed, so that the next operation will give a "location" call.

Broadly speaking my invention provides a selective "alarm" transmitting mechanism which is entirely distinct from and may be said to normally have no connection with the other signal transmitting mechanism,—but which is merely actuated by the general driving mechanism which actuates both, when the special "alarm" cut in device is selectively operated, and which is immediately and automatically returned to inoperative position after the completion of the last round of the "alarm".

I attain the objects above set forth by the means described and claimed herein, and illustrated in the accompanying drawings in which like symbols of reference refer to like parts throughout the respective views.

Fig. 3 is a perspective view of a detail of construction, being particularly the means for preventing more than one repetition of the "location" call from being transmitted by the operation of the watchman's key. Fig. 4 is an elevation of one form of key. Figs. 5 and 5ª are end and plan views of the locking lever or catch. Fig. 6 is an elevation of the key lock or plate shown in Fig. 3,—showing the key (in section) locked between its jaws at the extremity of its movement. Figs. 7 and 8 are perspective views of portions of my device in different positions during different phases of operation; Fig. 7 showing the position of said parts when the "alarm" is disconnected and inoperative; and Fig. 8 showing the positions when the "alarm" mechanism is cut in or operative.

Figure 1:
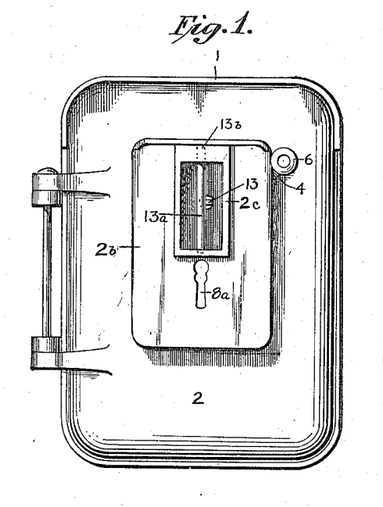
Figure 1 is a front elevation of one form of my complete box, assembled and ready for operation, and designed to permit the transmission of two different signals.
Figure 2:
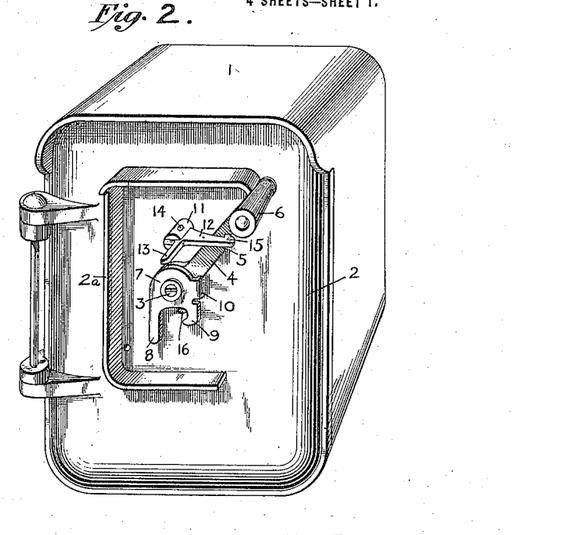
Fig. 2 is a perspective view of the same with the plate covering the operating lever and containing the seal removed to show certain external parts of the mechanism and locking devices.

Referring to Figs. 1 and 2, 1 represents the box or casing which may be of any desired form or design,—2 the door which is adapted to be ordinarily locked to the casing, as by a screw or other device not shown. 2ª is a frame or projecting wall adapted to partially inclose the alarm operating lever 4, the lock 12 for same, and the watchman's key lock plate 7, all shown exposed in Fig. 2. 2ᵇ is a cover or plate resting against 2ª and adapted to be screwed or otherwise secured to the door 2, lugs being provided on the back of 2ᵇ (not shown) for this purpose. 2ᶜ is a wall or open casing preferably integral with the cover 2ᵇ provided with an aperture 13ᵇ at the top, and a countersunk cavity at the bottom; through the aperture 13ᵇ, which is of suitable size and shape, may be passed a glass rod or other fragile or deformable device 13ª, seating in the cavity at the bottom and adapted to engage and hold in locking position the arm 13 of the right angled locking lever 12, (Fig. 2) which arm passes through an aperture in the cover 2ᵇ. 8ª is a key hole for the watchman's key.

Figures 5, 5A, 6, 7:
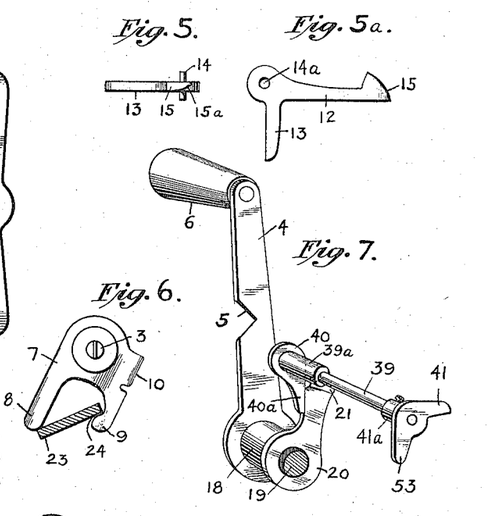

Referring particularly to Fig. 2,—11 is a slotted stud or lug projecting from the door 2, in the slot of which is secured with freedom of movement, the lever 12 turning on the pin 14 which seats in the hole 14ª; (see Figs. 5 and 5ª) one end 15 of the lever 12 is enlarged and rounded back so as to provide a catch having a double sliding surface or cam for a purpose described later; the edge of this cam or catch is also rounded off on the under side at 15ª (see Fig. 5). The "alarm" lever 4 having the handle 6, is loosely mounted on the shaft or staff 28 entering the bore 19 of the sleeve 18. The lever 4 is provided with a notch 5 having substantially right angled faces the lower of which is rounded off, (see Fig. 7). The lever 4 is normally held in place by the latch 15 of lever 12 engaging in the notch 5; the lever 12 being itself locked by the glass rod or seal 13ª engaging the arm 13. The rounded edges of the latch permit it to slide or ride up on the face of the notch 5 in the "alarm" lever 4 when the resistance of the seal is removed and the lever 4 pulled, and also allowing said "alarm" lever 4 to move back into position of engagement when returned by the retrogression of the clock work, after an alarm is sent in.

Figures 3, 4, 8:
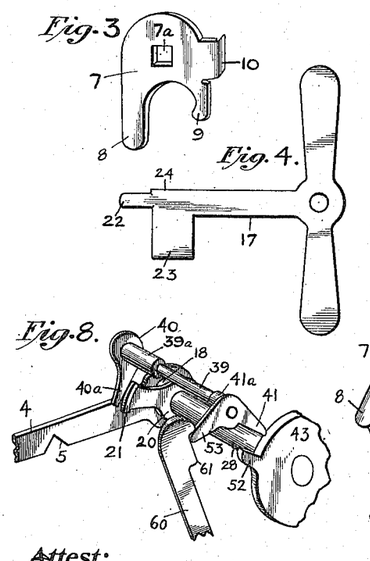

In Figs. 2. 3 and 6—7 is a lock plate preferably provided with a square aperture 7ª adapted to seat on the squared end 27 of the main shaft or staff 28, so that when the lock plate 7 is turned by the engagement of the end 23 of the key 17 against the jaw 8 (see Fig. 6) it will rotate the staff 28 with it. The plate 7 is also provided with a supplementary jaw or hook 9 adapted to engage the back 24 of the key 17 (the point 22 of which having been inserted in the hole 16 or otherwise held in position) so as to prevent its movement in rotation more than a certain pre-determined amount, usually sufficient to send in the "location" call only once. The plate 7 is further provided with a projection 10 substantially at right angles to its front face,—which normally engages or is engaged by the "alarm" lever 4 (see Fig. 2). The lock plate 7 is secured to the staff 28 by the set screw 3.

Figures 9, 10, 11, 12, 13:
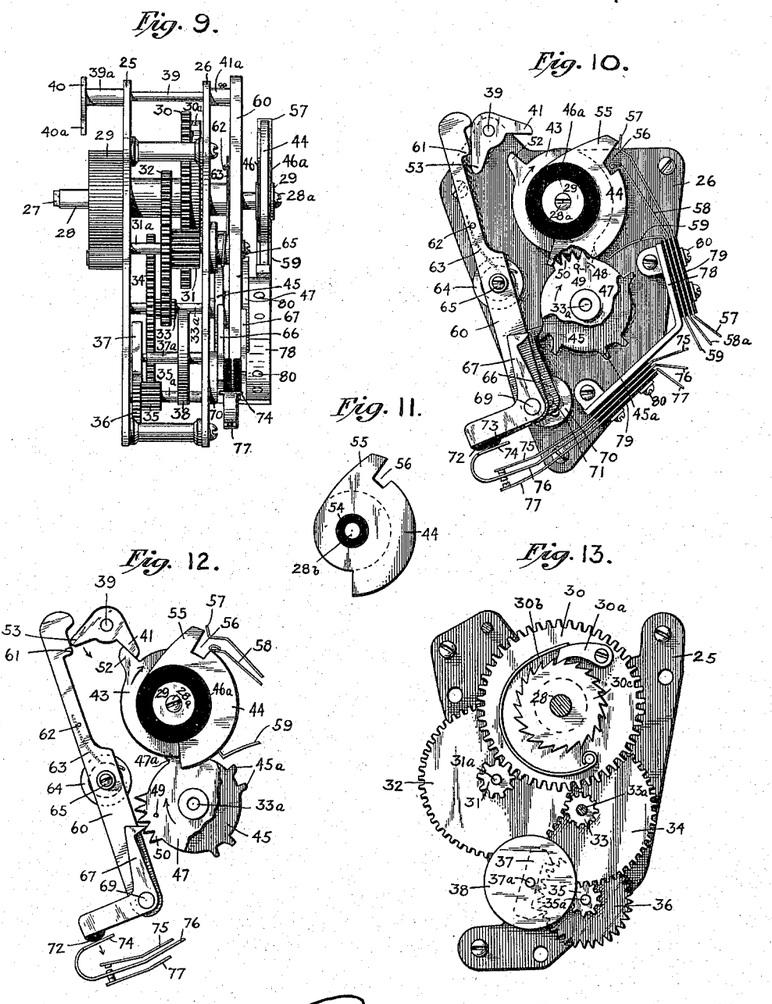
Fig. 9 is a side view or elevation of the interior mechanism removed from the inside of the box.
Fig. 10 is a rear view of this mechanism, showing the parts in normal position and at rest, ready for the transmission of the "location" signal.
Fig. 11 is an elevation of a detail of the mechanism,—showing the shunt wheel or cam.
Fig. 12 is a fragmentary view of portions of the mechanism,—showing the cut in device in operative position during the transmission of the "alarm" and just as the "alarm" lever is about to return to its normal position at rest.
Fig. 13 is an elevation of the driving mechanism; one plate, electric contacts, cut in devices, break wheels and cams having been removed.

Referring now to Fig. 9, which shows the usual clock work, together with certain of the novel devices forming my invention; in this view the whole interior mechanism has been removed from the back of the door 2,—and therefore does not show the parts heretofore described, including the "alarm" lever 4 and plate 7 which are of course in operative position when the whole is assembled. 25 and 26 are plates holding the mechanism in place, and forming bearings for the various pivots or staffs of the operating gears, and also providing supports for other portions of the mechanism. The staff 28 carries the usual main or driving spring 29,—which is wound up by the rotation of the plate 7, either through use of the key 17, or when the plate is actuated by the depression of the loosely mounted lever 4 engaging the projection 10. The staff 28 carries the gear 30 provided with the usual pawl 30ª, spring 30ᵇ, and ratchet 30ᶜ. (See Fig. 13.) Gear 30 meshes into the pinion 31 mounted on staff 31ª, gear 32 mounted also on 31ª is in turn driven thereby and meshes into pinion 33 mounted on staff 33ª carrying gear 34, which in turn meshes into pinion 35 mounted on staff 35ª,—driving escapement wheel 36 governed by anchor 37 and pendulum 38 mounted on staff 37ª. 39 is a staff journaled in plates 25 and 26; on one end of which, extending outside of and beyond plate 25, is firmly secured a sleeve 39ª having a cam or lever 40—40ª (see Figs. 7—8 and 9): On the other end of 39 projecting outside of and beyond the plate 26, is a sleeve 41ª securely held by a set screw which also permits adjustment. Attached to this sleeve is a two arm cam or lever having the arms 41—53 set substantially at right angles,—(see Figs. 7—8 10 and 12.)

It will be understood that when the mechanism is attached to the rear of the door 2, when the whole device is assembled,—the staff 28 slips through the bore 19 in the sleeve 18 of the alarm lever 4,—the sleeve 18 passing through an aperture in the door and the lever 4 being keyed to the sleeve 18 on the outside of the door 2,—the plate 7 then seats on the squared end 27 of said staff 28 to which it is secured by the set screw 3,—after removing which, the mechanism shown in Fig. 9 can be removed from the door 2 for examination or adjustment, by unscrewing certain screws (not shown) which secure it thereto.

Again referring to Figs. 7 and 8:—Attached to the inner end of the sleeve 18—is the cam or lever 20 which moves coincidently with the lever 4; and the enlarged end 21 is adapted to bear against the arm 40ª so that when the lever 4 is pulled or rotated, the staff 39 is also rotated sufficiently to bring the arm 53 in contact with the shoulder 61 on "cut in" lever 60 (see Figs. 12—10) throwing it into operating position for transmitting the "alarm" as will be hereafter explained.

Referring now particularly to Fig. 10, 43 is a cam mounted adjustably on staff 28, and provided with a stop or shoulder 52 adapted to engage arm 41 of cam on staff 39 at a certain period of the rotation of cam 43 when arm 53 is in engagement with 61. (See Fig. 12.) Cam 43 is also provided with another shoulder 48 on its opposite side (shown in dotted lines in Fig. 10) which engages the pin 49 on cam 47 at the proper moment and brings the mechanism to rest. Cam 44 is the shunt cam or wheel and has a projection 55, and a recess 56 in its periphery, and an insulating core or bushing 54 provided with the hole 28ᵇ. (See Fig. 11.) It is secured between two insulating plates 46 and 46ª on the shaft 28 by means of the washer 29 and set screw 28ª so that it is insulated from the shaft and other parts of the mechanism; the contact brushes 58 and 59 engage the periphery of this wheel so as to form a shunt during certain stages of the operation, and the brush 57 engages the projection 55 as will be described hereafter.

60 is the "cut in" lever normally in position shown in Fig. 10; it is freely mounted on a stud or shoulder 64 to which it is secured by the screw 65; a pin 62 retains the end of a spring 63 which tends to normally keep the lever 60 in position shown in Fig. 10, that is to say, with its lower end bearing the contact lever 67 in such position that 67 cannot engage the teeth on the break wheel or cam 47. This contact lever 67 is loosely mounted on a stud or pivot 69 in the lower end of the lever 60; its upper arm is provided with a projection or point, which,—when lever 60 is forced by the rotation of 53 into operative position for transmitting an "alarm", (see Fig. 12), is adapted to engage the teeth 50 and 47ᵃ of the "alarm" break wheel cam 47, but which at other times is inoperative as shown in Fig. 10. The lower arm of the lever 67 is provided with an insulation plate 72 which bears against an enlarged surface 74 of spring 76.

Figure 17:
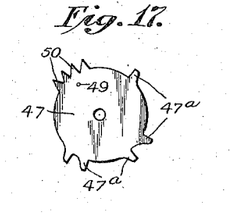
Fig. 17 is an elevation of the "alarm" break wheel disk showing the teeth not shown in the same part broken away in Figs. 10 and 12.

The cam or disk 47 (see Fig. 17) is provided with teeth 50 which are of such number and so arranged as to transmit certain predetermined impulses which may be of any desired number; (I have indicated five teeth in the drawing) together with the impulses transmitted by the additional teeth 47ᵃ. This constitutes the "alarm";—this disk 47 is mounted on staff 33ᵃ in train with the other gears and shaft 28, and is provided with a pin 49 which acts as a stop to engage the projection 48 of cam 43 when this cam has returned to position after either call has been transmitted, thus bringing the mechanism to rest. The disk 47 is broken away in Figs. 10 and 12 to show the other cam or disk 45 mounted on the same shaft 33ᵃ; this disk 45 is provided with teeth 45ᵃ arranged in any desired relation or order so as to give a distinctive call such as a "location" number,—by engaging the projection on lever 66 as shown in Fig. 10.

The lever 66 is similar to lever 67 but is mounted on a stud or base 70 (Figs. 9 and 10) so that it can move freely about the pivot 71. The other end is provided with the insulating plate 73 which bears against the enlarged surface 74 of spring 76 in the same manner as does the corresponding part of lever 67.

74—75 and 76 are springs or contacts, operated by either or both of the levers 66 and 67, depending upon whether the "cut in" lever 60 is moved into operating position, or remains in normal position.

76 is connected to the main line wire 81, (see Figs. 14—15) and is normally in contact with 75 which is connected between 81 and its continuation from post Y of box A, and forms a closed circuit when in position of rest as shown in Fig. 10. 77 is connected to the ground, operating according to the well known McCullough system, and I am thus enabled to obtain the advantages of that system by the use of one wheel both in the "location" call disk 45, and "alarm" disk 47, either and both disks operating the same springs and contacts 75—76—77. These contact springs are insulatedly mounted on the rigid frame or stand 78 secured to the plate 26.

Contact springs or brushes 58 and 59 are similarly mounted on frame 78 and constitute the shunt circuit, the operation of which is well known and understood,—its purpose is to divert or shunt the current during the operation of the box so that all boxes farther on in the circuit will be inoperative while the signal is being sent in by any particular box. On reference to Fig. 12 it will be noticed that the cam 44 having been partly rotated to the left on shaft 28, the brushes 58—59 are in contact with the periphery of wheel 44, thus completing the shunt circuit through the particular box,—59 being connected to the main line wire 82 and also to 75. (See Fig. 15.)

Figure 15:
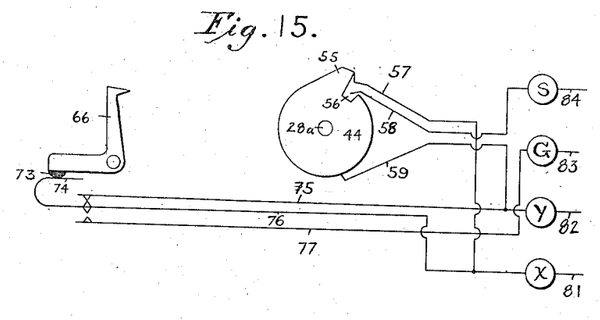
Fig. 15 is a diagram showing the wiring circuits of the box itself.
Figure 16:
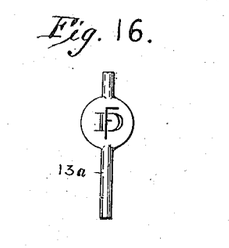
Fig. 16 is an elevation of one form of the seal.

The contact brush 57 is normally, when the box is at rest,—in contact with the projection 55: 57 is further connected to 76 and to the other wire 81 of the metallic circuit (see Fig. 15.) The object of this is that normally when at rest the current is passing through brush 59, cam 44, out through brush 57, thus minimizing the danger of injury to the contact points on the ends of springs 75—76 through excessive currents, from crossing wires, or otherwise. Upon rotation of cam 44, however, (as shown in Fig. 12) spring 57 is out of contact with cam 44 thus restoring circuit through 75 and 76 except when broken by the operation of cams 45—47 and the operating lever 66—67.

Figure 18:
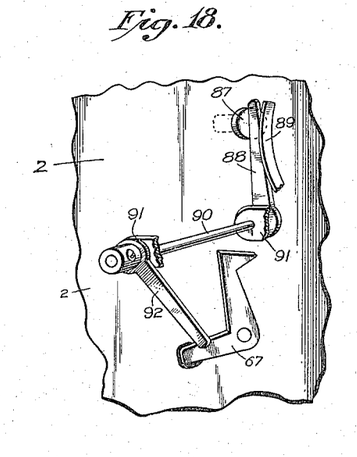
Fig. 18 is a perspective view of a detail of the mechanism for transmitting a third signal such as a "drill" or other signal, this detail may or may not be embodied in the complete box mechanism depending upon whether or not the box is designed to transmit two, or more than two signals. It is not shown in previous figures to avoid complicating the drawings.
Figure 19:
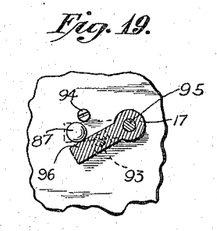
Figs. 19 and 20 also illustrate additional details for operating the third signal, and a modified form of key used on a box embodying the third signal device.
Figure 20:
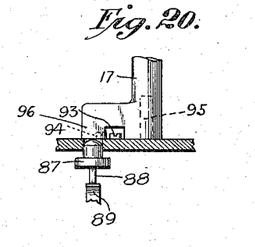

Referring now to Figs. 18, 19 and 20, in some States,—it is required that such devices as I have described shall embody facilities for sending in a special signal not a mere "location" call, nor an "alarm", but which may be termed a "drill" signal. This signal is usually sent in at irregular periods to test the service, and especially to cause an assembly of occupants of a building, as the operatives in a factory, or scholars in a school; I have provided for such requirement by arranging a modification of my device, by which a special key, which may be in the possession of an inspector or other authorized person, is adapted to operate my device so as to send in the special signal which is distinctive and different from the other signals,—though it may combine certain of the features of the others.

In the figures mentioned 87 is a push button or other device inserted in an aperture in the door of the box,—the front or external face of which button is preferably rounded: a shoulder on the back limits its projection. 93 is a stop to limit the movement of the key employed to send in the "location" signal,— which key has a plain web adapted to engage the stop 93. 94 is a stop to limit the movement of the "drill" signal key. 95 is a key post, substituted for the aperture 16 shown in Fig. 2,—in which the solid shank or pin 22 of key 17 is adapted to fit, when the style of key shown in Fig. 4 is utilized.

96 is the bit or web of the inspector's key adapted to engage and displace the push button 87, and which is provided with a slot or recess adapted to allow the web to pass over the stop 93. The web 96 is prevented from turning too far after engaging 87, by the stop 94.

88 is a lever engaged by the back of push button 87. It is held against the latter by the spring 89. 90 is a rock shaft to which the lever 88 is secured,—this rock shaft is journaled in suitable bearings 91 on the plate 25 not shown in Fig. 18; on the other end of the rock shaft 90 is adjustably secured a lever 92 adapted to engage and depress the lever 67.

Figure 14:
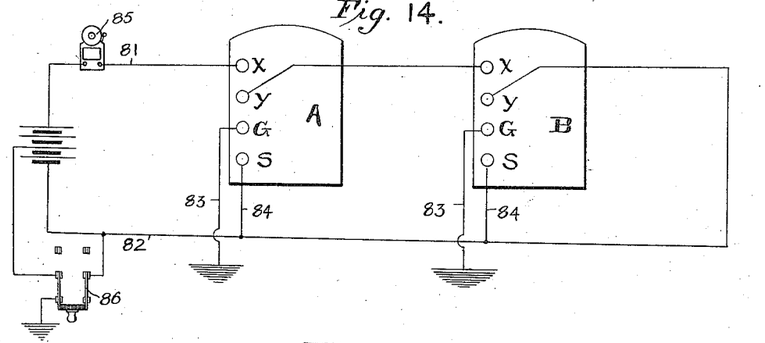
Fig. 14 is a diagram showing the wiring circuits of a system comprising a plurality of my devices.

Referring to Fig. 14,—81 is the wire of the metallic circuit leading to terminal or binding post X of box A, in which circuit there is of course a battery or other source of current and the well known and usual recording and other devices of the system; the circuit leads from binding post Y to binding post X of box B, and so on throughout the whole circuit,—returning as wire 82; 83 are the ground connections of the McCullough system connected to binding posts G. 84 are shunt connections from binding posts S joining wire 82 as above explained.

One feature of my invention which I have only touched on is the special type of lock or seal to prevent the unauthorized or improper sending in of the alarm. While any fragile, deformable or removable device of suitable size and shape and material may be employed, I prefer to provide one indicating, by means distinct from and additional to its shape and location, that it is an official or proprietary guard against improper or unauthorized interference with the mechanism;—as I have found that such a device bearing special indicia of authority is much more respected than one without such indicia. I therefore blow in glass, impress, engrave or otherwise make a feature,—some such warning or indication,—such as the word "seal", "official", the initials of the fire-department, the arms of the city, or the like,—or produce upon it a representation in shape or design or color which will indicate its official proprietary significance. Also, by placing the mechanism entirely on the cover, I am thus enabled to make quick and easy inspections and when necessary adjustments or repairs.

The operation of my device is as follows:—When the watchman desires to transmit his location call he inserts his special key into the key hole $8^a$ (Fig. 1) and turns it as far as it will go,—the jaw 9, (Fig. 6) limiting this movement so that the plate 7 can only be rotated sufficiently to turn the shaft 28 far enough to cause the ratchet $30^c$ (Fig. 13) to pass one tooth past the pawl $30^a$ (this being sufficient to cause the break wheel disk 45 to make one revolution). As the glass rod or seal is unbroken,—the lever 4 is not rotated, the staff 28 is turned by 7, rotating in the hole 19 of the sleeve 18, and the parts shown in Fig. 7 remain in the position illustrated in that figure and in Fig. 10; that is to say,—the distinctive alarm mechanism is not "cut in." The clock mechanism however transmits the reaction of the spring 29 which has been in part wound up by the key,—to break wheel 45, which rotates, bringing the teeth $45^a$ forming the "location" call on disk 45,—in contact with the lever 66; this lever in turn depresses the spring 74—76 breaking the circuit between 75 and 76 and causing the call to be transmitted to the central station. At the beginning of the movement of the staff 28, the cam 44 on staff 28 begins to be rotated into position shown in Fig. 12; as a consequence contact spring 57 is at once disengaged from the projection 55 thus opening the short circuit and establishing the circuit through 75—76 except when it is broken by 66 as above described. Also at the same time and by the rotation of cam 44 the contact spring 58 is brought in contact with the periphery of the cam, with which contact spring 59 is already in contact, thus establishing a shunt circuit which cuts out all boxes farther on in the circuit. With the rotation of staff 28 carrying cam 44, above described, cam 43 is also rotated to the left (looking at Fig. 10) thus removing shoulder 48 from engagement with pin 49 on disk 47 which is thus freed and allows the clock work to operate; as the staff $33^a$ bearing the break wheel 45 rotates much faster than the cams 43 and 44, the break-wheel 45 will complete one revolution in the direction of the arrow, bringing the teeth $45^a$ successively into engagement with lever 66 thus sending in the full "location" call. The mechanism is so adjusted and the ratio of gears is so proportioned that the cam 43, also rotating in the direction of its arrow, brings its shoulder 48 into engagement with the pin 49 when the "location" call is completed,—that is to say at the end of one complete revolution of cam 45, thus bringing the whole mechanism to rest as in Fig. 10. If now it is desired to transmit an alarm,—the seal $13^a$ is broken; the lever 4 pulled down,—and by that movement rides up on the inside curved or inclined face of the catch 15 of the lever 12, forcing the latter out of engagement with the notch 5. If desired the seal $13^a$ may be made sufficiently light or fragile to be broken by the movement of the lever itself, while yet strong enough to retain the parts in position unless a deliberate effort is made to pull the lever.

Although the staff 28 is free to turn in the sleeve 18 of the lever 4,—yet when lever 4 is pulled to send in the "alarm" it engages the shoulder 10 of the key plate 7 and forces the latter to turn with it,—thus in turn rotating staff 28 to which 7 is secured on the squared end 27,—just as positively as if the lever 4 were itself keyed to staff 28. In short,—staff 28 is turned directly by plate 7 to send in the "location" call without lever 4 being moved or the alarm sounded,—but lever 4 cannot be moved without rotating 7 and at the same time cutting in the special alarm device as hereafter explained. Now when the lever 4 is pulled, not only is staff 28 rotated so as to wind the spring 29, but at the same time the arm 21 (see Figs. 7 and 8) which is secured to sleeve 18 and turns with lever 4, is brought into positive engagement with arm 40ª on staff 39, turning the latter about its axis and as a consequence bringing arm 53 against the shoulder 61 of lever 60 (see Figs. 8–10 and 12) 53 rides up on this shoulder forcing the lower end of lever 60 into such position relative to the "alarm" disk 47 that the projection on the lever 67, mounted on the lower end of 60, is brought into the path of the teeth on "alarm" disk 47. When the latter has rotated sufficiently to bring these teeth into engagement with the lever 67 (see Fig. 12) the spring 74 is depressed and the contact springs 75—76 are separated, thus breaking the circuit and sending in the "alarm" in a similar manner to that already described in explaining the transmission of the "location" call.

Of course it will be understood that when the lever 4 is pulled and released the consequent reverse rotation of shaft 28 (when actuated by the spring 29) drives both disks,—45, operating the "location" call lever 66, and the disk 47, sending in the "alarm" through lever 67, since both disks are mounted on the staff 33ª; the "alarm" signal is so regulated by the relative disposition of the teeth 50 on disk 47 as regards the teeth 47ª on that disk,—that the complete "alarm" is sent in at each revolution of the wheel,—though only when the "alarm" lever is pulled. In such case the operation of the contacts by disk 45 and lever 66, is simultaneous with the operation of the contacts by disk 47 and lever 67, the complete "alarm" thus including the "location," and replacing the "location" call alone; in other words the "location" call may be said to be merged in the "alarm."

It will be further understood that simultaneously with the pulling of the lever 4 and the consequent turning of 53 into engagement with 61, the cam 43 is rotated to the left so that shoulder 52 is rotated out of the path of arm 41, as that latter is forced into position shown in Fig. 12.

The operation of all the other parts is identically the same as already described in connection with the explanation of the sending in of the "location" call.

It will be understood that if the watchman's key be used, only the "location" call will be transmitted, the "alarm" being normally inoperative, and entirely disconnected,—and that it will be sent but once; that when the lever 4 is pulled the "alarm" must necessarily be sent; and that the "alarm" may consist of both the "location" call and the distinctive "alarm" stroke combined with the "location" call or any suitable signal embodying an alarm and means for distinguishing the location thereof; and that the "alarm" will be sent a less or greater number of times depending upon how far the lever 4 is pulled, with the consequent degree of tension applied to main spring 29; and the extent of the simultaneous rotation of shoulder 48 on the cam 43 out of the path of the stop pin 49. Now when the alarm has been transmitted, the mechanism is brought to rest, and the specific "alarm" devices returned to inoperative or normal position as shown in Fig. 10, as follows:—The cam 43 having in its movement in the direction of the arrow, returned to the position shown in Fig. 12, the shoulder 52 is brought into engagement with arm 41 of the tripping lever, and as the movement progresses the arm is finally forced in the direction of the arrow, off from the shoulder 61 on lever 60.

The movement of the lever 4 back into first position,—because of the movement of the clockwork,—has before this removed the arm 20—21 (Figs. 8 and 9) out of the path of the arm 40—40ª so that the staff 39 and lever 41—53 has free movement; now after 53 has passed over the edge of 61, it no longer opposes any resistance to the movement of the lever 60, which, actuated by the spring 63, is snapped quickly back into position shown in Fig. 10, thus removing lever 67 out of the path of teeth 50—47ª this action is timed to take place just after the last distinctive "alarm" signal has been sent in and practically simultaneously with the engagement of shoulder 48 with pin 49.

The operation of the box embodying the modification shown in Figs. 18—19—20 is as follows:—The turning of the watchman's key,—(which is made without the slot or recess shown in Figs. 19—20) operates the mechanism as heretofore described, and which need not be repeated,—to send in the "location" signal; this key is stopped by engaging 93 so that nothing but the "location" signal can be sent by this key. The inspector's key, however, in turning passes over the stop 93, and depressing the push button 87, moves the lever 88, the rock shaft 90, and the lever 92, thus depressing one end of 67 and operating the contact springs 74—75—76—77 breaking the metallic circuit and closing the ground in the way already described as being performed by the lever 67 when operated by the cam 47. This causes a single stroke to be sounded on the bell or other device in circuit; at the same time the turning of the key has turned the plate 7 as already described, and the mechanism,—after the key is released,—proceeds to operate as usual sending in the call from cam 45 through the intermediate lever 66. In this case the "drill" signal comprises the single stroke caused by the depression of the push button, plus the "location" number sent by the impulses of teeth on cam 45. It will be understood that in all this, the special "alarm" mechanism including the lever 60—is inoperative, except in so far as the lever 67 is momentarily depressed by the movement of the push button 87 and the intermediate levers 88 and 92. It will also be understood that the "alarm" can be "cut in" at any time even during the transmission of the "drill" or "location" signals by the depression of the lever 4; since the "alarm" signal is independent of and separate and distinct from either of the other signals.

It is evident that instead of using two separate break-wheel disks, one embodying only the peculiar arrangement of teeth or other means capable of transmitting the "location" signal, and another disk embodying another arrangement of teeth adapted to transmit a signal comprising both an "alarm" and the "location" signal which is in reality the complete "alarm",—I may provide a "location" breakwheel disk, adapted to transmit only the "location" signal, and a disk containing only teeth or means adapted to sound a distinctive signal of "alarm", utilizing the "location" breakwheel disk in connection with and coöperating with the "alarm" disk to constitute as a whole a different signal having the significance of an "alarm", but also indicating the location of the alarm.

It will be further understood that the operation of the shunt circuit; the McCullough system; and the breaking of the short circuit through the cam 44, to prevent oxidation of the contact points 75—76— is the same whether the "location", "drill" or "alarm" signal is being transmitted.

It will be noted that I dispense with the use of "pens" bearing on the breakwheels,—to make and break the contacts between the contact springs, and utilize only one set of contact springs for the "location" "drill" and "alarm" signals, separate levers being employed to transmit the impulses of the push button and the breakwheel teeth to the same contact springs.

I do not limit myself to the exact shape or arrangement of parts shown and described herein, as these may be departed from without departing from the spirit of my invention. But

What I claim and desire to protect by Letters Patent is:—

1. In a signal transmitter, a break wheel; actuating means for causing the break wheel to rotate a limited number of times; contact points; means permanently in operative position for transmitting the impulses of the break wheel to the contact points; a second break wheel adapted to rotate isochronously with the first; separate actuating means for causing the break wheels to rotate a greater number of times; a movable member adapted to be operated by the separate means, and adapted when so operated to establish connection between the second break wheel and contact points; and means for automatically disengaging said connecting means at the completion of the second signal.

2. In a signal transmitter, the combination of a clock train; a break wheel disk driven thereby, and arranged to transmit a given signal; contact springs adapted to be connected in circuit; a lever intermediate the break wheel and contact springs adapted to operate the contact springs; a second disk on the same staff as the first disk, arranged to transmit a different signal from the first signal; a cut in lever bearing on one end an oscillating lever adapted to be engaged by the second disk, and to operate the same contact springs when the cut in lever is in operative position; means for throwing the cut in lever into operative position selectively and at will; means for automatically throwing the cut in lever out of operative position after the completion of the last round of the second signal; a cam and contact brushes arranged to provide a short circuit cutting out the contact springs operated by the disks when the transmitter is at rest, and to cut in the contact springs and also form a shunt circuit when the transmitter is operated.

3. In a signal transmitter, the combination of means for transmitting a plurality of different signals; mechanism arranged to normally operate one of said transmitting means selectively and without the other; and means for temporarily and at will cutting in the second transmitting means, until its signal is transmitted; a cam and contact brushes arranged to provide a short circuit cutting out the contact springs when the transmitter is at rest, and cutting them in and also forming a shunt circuit when the transmitter is operated.

4. In a signal transmitter, the combination of a signal transmitting device; means for operating the device to transmit the signal a limited number of times; a second signal transmitting device driven synchronously with the first and arranged to transmit a different signal; separate operating means for causing the second signal device to transmit its signal a greater number of times; contact points; means intermediate the first transmitting device and the contact points for operating the latter; a member normally out of, but adapted to be brought at will into operative position intermediate the second transmitting means and the contact points by the separate operating means; and means for automatically returning said intermediate means into inoperative position after the second signal has been transmitted.

5. In a signal transmitter, a driving shaft and means for actuating it; a break wheel driven therefrom; a second break wheel on the same shaft and revolving isochronously with the first; separate means for actuating the shaft selectively and at will; a member operated by the separate actuating means adapted to at any time cut in the second break wheel until its signal is completed,— and means for automatically throwing said member out of operation at the termination of the second signal.

6. In a signal transmitter, the combination of a break wheel adapted to transmit a signal; contact points; means intermediate the break wheel and contact points adapted to be operated by the break wheel at all times to operate the points; a second break wheel adapted to transmit a different signal; a lever normally inoperative and bearing means adapted to make contact between the second break wheel and the contact points when thrown into operative position;— means for throwing the lever into operative position selectively and at will; and means for automatically throwing the lever out of operative position when the second signal has been completed.

7. In a signal transmitter, the combination of signal transmitting means; contact points adapted to be connected with metallic and ground circuits; means intermediate the transmitting means and the contact points normally in operative position for making and breaking the said circuits; a second signal transmitting means driven synchronously with the first signal transmitting means, and arranged to transmit a different signal; a member movably mounted and normally inoperative but adapted to be brought into intermediate and operative position relative to the second transmitting means and the contact points at will; means for bringing said member into such position; means for automatically returning said member into inoperative position after the second signal has been transmitted; and means for automatically establishing a short circuit cutting out the contact points when the device is inoperative, and establishing the main circuit and a shunt circuit when the device is operated.

8. In a signal transmitter; the combination of a plurality of means for transmitting different signals selectively and at will; contact points; separate operating means for causing the transmission of each signal; a spring actuated lever having mounted thereon means for connecting one of said transmitting means with the contact points; means for controlling the movement of said lever so as to bring the connecting means mounted thereon into operative position when it is desired to transmit one of the signals; and means for automatically retracting said lever so as to terminate the connection at the termination of said signal.

9. In a signal transmitter; the combination of signal transmitting means; means for operating the same; contact points; means intermediate the transmitting means and the contact points permanently in operative position for making and breaking circuit; a second signal transmitting means driven synchronously with the first transmitting means, and arranged to transmit a different signal; separate means for operating the same; a member movably mounted and normally inoperative but adapted to be brought into intermediate and operative position relative to the second transmitting means and the contact points at will; means for bringing said member into such position; and means for automatically returning said member into inoperative position after the second signal has been transmitted.

10. In a signal transmitter; the combination of a signal device; contact points; intermediate mechanism between the signal device and the contact points for operating the latter; means for actuating the signal device; a second signal device; a movable member having mounted thereon means for connecting the second signal device with the contact points; separate means for actuating the second signal device and simultaneously controlling the movement of the movable member so as to make connection between the second signal device and the contact points; and means for automatically terminating said connection after the signal has been transmitted.

11. A signal transmitter comprising in combination a plurality of transmitting devices; operating mechanism arranged to cause one of the transmitting devices to operate a limited number of times; separate operating mechanism arranged to cause the second transmitting device to operate a greater number of times; a movable member operated only by the separate operating mechanism and adapted to be held thereby in position, and to maintain in operation the second signal transmitting device until its signal is transmitted; and means for automatically and suddenly cutting said movable member out at the completion of the second signal.

12. In a signal transmitter, a driving mechanism; a plurality of signal transmitting means driven thereby; a member secured to the shaft of the driving mechanism, the movement of which actuates the driving mechanism; means for giving the said member a limited movement; an operating lever loosely mounted on said shaft and normally inoperative but adapted to engage the said member and impart to it a relatively greater movement when desired; means by which the limited movement insures the transmission of one signal; and means adapted to be made operative by the normally inoperative member which insures the transmission of the other signal.

13. In a signal transmitter, the combination of independent means for separately and at will controlling the production of impulses constituting a plurality of different signals both of which include location indicating impulses; mechanism arranged to normally operate one of said means selectively and without the other; and means for temporarily and at will cutting in the second means at any time.

14. In a signal transmitter, the combination of independent means for separately and at will controlling the production of impulses constituting a plurality of different signals both of which include location indicating impulses; mechanism arranged to normally operate one of said means selectively and without the other; and means for temporarily and at will cutting in the second means at any time, and maintaining its operative parts in constant relative position until its signal is completely transmitted.

15. In a signal transmitter, a plurality of independent signal transmitting means; separate means for operating each; one set of contact points through which all signals are transmitted; means intermediate the contact points and one of the transmitting means normally in position for operating the contact points; a movable member bearing connecting means normally out of position but adapted to be automatically placed intermediate the contact points and the second transmitting means when said second transmitting means are operated by their separate operating means.

16. In a signal transmitter; the combination of signal transmitting means and means for operating the same; contact points; separate means for operating said contact points independently of the signal transmitting means comprising levers engaging said contact points and adapted to be actuated by the signal operating means.

17. In a signal transmitter; the combination of means for transmitting a signal; operating mechanism adapted to normally and at all times operate said transmitting means; contact points adapted to be connected in circuit with a signal recorder; means intermediate said transmitting means and the contact points for operating the latter normally and at all times during the operation of the device; a second transmitting means adapted to transmit a different signal; a pivoted movable member having mounted thereon means for connecting the signal transmitting means with the contact points; means for controlling the movement of said member when it is desired to transmit the second signal; and means for automatically returning said member so as to terminate the connection at the termination of said signal and so leave the transmitter in readiness to transmit only the first signal.

18. In a signal transmitter, the combination of independent means for separately and at will controlling the production of impulses constituting a plurality of different signals; mechanism arranged to normally operate one of said means independently, selectively and at will; and separate means for operating the second of aforesaid means selectively, at will, and independent of the first and maintaining its operative parts in constant relative position until the second signal is completed.

19. In a signal transmitter, the combination of separate and independent means for controlling the production of impulses constituting a plurality of different signals, one of which is always normally operative and the other normally inoperative; and means for selectively and at will cutting in the normally inoperative means and maintaining its operative parts in constant relative position until its signal is completed.

20. In a signal transmitter; a break wheel; contact points; and a spring actuated swinging lever having mounted thereon an oscillating lever adapted to be placed in contact with and between the break wheel and the contact points when the swinging lever is swung into operative position.

21. In a signal transmitter; the combination of a break wheel; contact points; and a movable lever having mounted thereon an intermediate connection between the break wheel and the contact points adapted to be thrown into connection with the break wheel only by the movement of the movable lever.

22. In a signal transmitter; the combination of signal transmitting means; means for operating said signal transmitting means so as to transmit its signal selectively and at will; a second signal transmitting means driven isochronously with the first; separate means for operating said second transmitting means irrespective of the operation of the first transmitting means; means for cutting in the second transmitting means at will until its signal has been transmitted; and means for automatically cutting out the second signal transmitting means after the completion of its signal.

23. In a signal transmitter, a combination of means for transmitting a plurality of different signals; mechanism arranged to normally operate one of said transmitting means selectively and without the other; means for automatically and at will cutting in the second transmitting means until its signal is transmitted; and means for short circuiting the contact springs when the transmitter is at rest, and cutting them in and also forming a shunt circuit when the transmitter is operated.

24. In a signal transmitter, means normally operative for controlling the production of impulses constituting a signal; actuating means therefor adapted to cause the signal to be transmitted a limited number of times; independent means normally inoperative for controlling the production of impulses constituting a second and different signal a greater number of times and independently of the first signal producing means; separate actuating means therefor; a movable member adapted to be controlled by the separate actuating means for maintaining the operating parts of the second signal producing means in constant relation until its signal is completely transmitted; and means for automatically and suddenly returning said movable member to inoperative position at the completion of the second signal.

25. In a signal transmitter, a break wheel; contact points; intermediate connections between the break wheel and contact points; driving mechanism for the break wheel; a key contact member firmly mounted on the driving mechanism shaft adapted to be engaged by an external key; an operating lever loosely mounted on the same shaft and adapted to engage the key contact member; a second break wheel; a swinging lever having mounted thereon means for establishing connection between the second break wheel and the contact points when the lever is swung into position; a rock shaft having arms adapted to be engaged by the loosely mounted operating lever and itself adapted to operate the swinging lever; and means for releasing the swinging lever.

26. In a signal transmitter; means for transmitting a signal; mechanism for actuating the above adapted to be operated by engagement of a key; a second signal transmitting means actuated by the same mechanism and adapted to transmit a wholly independent signal; different operating means adapted to operate said mechanism; a movable member actuated by said different operating means and bearing an element of the second transmitting means and adapted to hold said element in fully operative position to complete an electrical circuit until the second signal is completed; means for suddenly and automatically returning said member into normal position to break the circuit upon the completion of the full second signal.

27. In a signal transmitter the combination of a signal device normally in circuit; means for actuating said signal device to a limited degree; a second signal device normally out of circuit; means for actuating the second signal device to a greater degree; a spring actuated lever adapted to place the second signal device in circuit simultaneously with, and by the operation of the second actuating means; and means for automatically tripping said lever so as to suddenly throw the second signal device out of circuit at the completion of its distinctive signal.

28. In a signal transmitter, a combination of a plurality of signal transmitting devices; and means for shunting a circuit by the operation of the driving mechanism and during the whole operation of either signal transmitting means.

29. In a signal transmitter; the combination of signal transmitting means and means for operating the same; contact points, separate means for operating said contact points independently of the signal transmitting means comprising levers engaging said contact points, and a plunger engaging said levers, said plunger being adapted at all times to be engaged by a special signal operating means.

30. In a signal transmitter, the combination of independent means for controlling the production of impulses constituting a plurality of different signals; mechanism arranged to normally operate one of said impulse producing means; and separate means for causing the production of impulses constituting a second signal and for maintaining its operative parts in constant relative position until its signal is completed.

PIERRE ALEXIS PROAL DAVIS.

Witnesses:
CHARLES H. MILLER,
WM. L. DOWNEY.

Copies of this patent may be obtained for five cents each, by addressing the "Commissioner of Patents, Washington, D. C."